US008562466B2

(12) United States Patent
Mevissen et al.

(10) Patent No.: US 8,562,466 B2
(45) Date of Patent: Oct. 22, 2013

(54) BELT TENSIONER WITH WEAR COMPENSATION

(75) Inventors: Hubertus G. Mevissen, Schomberg (CA); James W. Dell, Newmarket (CA)

(73) Assignee: Litens Automotive Partnership, Woodbridge (CA)

(*) Notice: Subject to any disclaimer, the term of this patent is extended or adjusted under 35 U.S.C. 154(b) by 1163 days.

(21) Appl. No.: 11/908,187

(22) PCT Filed: Mar. 20, 2006

(86) PCT No.: PCT/CA2006/000422
§ 371 (c)(1),
(2), (4) Date: Sep. 10, 2007

(87) PCT Pub. No.: WO2006/099731
PCT Pub. Date: Sep. 28, 2006

(65) Prior Publication Data
US 2008/0194366 A1    Aug. 14, 2008

Related U.S. Application Data

(60) Provisional application No. 60/663,853, filed on Mar. 21, 2005.

(51) Int. Cl.
*F16H 7/10* (2006.01)
*F16H 7/12* (2006.01)

(52) U.S. Cl.
USPC ............................ 474/135; 474/112; 474/133

(58) Field of Classification Search
USPC ..................... 474/101, 112, 110, 135, 133
See application file for complete search history.

(56) References Cited

U.S. PATENT DOCUMENTS 3,975,965 A    8/1976   Speer
4,473,362 A *  9/1984   Thomey et al. ............... 474/135
(Continued)

FOREIGN PATENT DOCUMENTS

CA    1273510    9/1990
CA    2469497    6/2003
(Continued)

OTHER PUBLICATIONS

CN 201010205346.7—Second Office Action (English translation)—Apr. 12, 2012.

*Primary Examiner* — William A Rivera
*Assistant Examiner* — Henry Liu

(57) ABSTRACT

A novel tensioner for use with flexible drives, such as serpentine accessory belts on automobiles includes a tensioner arm to spindle pivot design which employs a frustoconical bushing between an inner pivot surface of the tensioner arm and a spindle shaft. The frustoconical design of the bushing resists off axis movement of the tensioner arm and a wear take up mechanism biases the bushing into contact with the inner pivot surface to compensate for normal wear of the bushing and/or pivot surface. A thrust plate is mounted to the end of the spindle shaft and rides in a thrust washer, the thrust plate and thrust washer being held captive in the tensioner arm such that the tensioner arm can pivot about the bushing and the spindle and the thrust plate and thrust washer assist in inhibiting off-axis movement of the tensioner arm. In one embodiment, the biasing force which biases the bushing against the inner pivot surface of the tensioner arm can be varied to change the amount of dampening of the tensioner.

11 Claims, 10 Drawing Sheets

(56) References Cited

U.S. PATENT DOCUMENTS

| | | | |
|---|---|---|---|
| 4,698,049 A * | 10/1987 | Bytzek et al. | 474/135 |
| 4,773,892 A * | 9/1988 | Zarife et al. | 474/138 |
| 4,816,011 A * | 3/1989 | Kotzab | 474/111 |
| 4,822,322 A * | 4/1989 | Martin | 474/135 |
| 4,826,471 A * | 5/1989 | Ushio | 474/135 |
| 4,834,694 A * | 5/1989 | Martin | 474/135 |
| 4,878,885 A * | 11/1989 | Brandenstein et al. | 474/135 |
| 4,971,589 A * | 11/1990 | Sidwell et al. | 474/135 |
| 4,983,145 A | 1/1991 | Hirai et al. | |
| 5,015,216 A * | 5/1991 | Brandenstein et al. | 474/101 |
| 5,057,059 A * | 10/1991 | Sidwell et al. | 474/135 |
| 5,083,983 A | 1/1992 | Hirai et al. | |
| 5,120,277 A * | 6/1992 | Georget et al. | 474/117 |
| 5,149,306 A * | 9/1992 | Sidwell et al. | 474/135 |
| 5,169,368 A * | 12/1992 | Quintus et al. | 474/135 |
| 5,236,396 A * | 8/1993 | Golovatai-Schmidt et al. | 474/101 |
| 5,256,112 A * | 10/1993 | Thomey et al. | 474/112 |
| 5,277,666 A | 1/1994 | Kumm | |
| 5,348,514 A * | 9/1994 | Foley | 474/135 |
| 5,407,397 A * | 4/1995 | Foley | 474/135 |
| 5,458,541 A * | 10/1995 | Adler et al. | 474/135 |
| 5,599,245 A * | 2/1997 | Giese | 474/135 |
| 5,620,385 A * | 4/1997 | Cascionale et al. | 474/112 |
| 5,772,549 A * | 6/1998 | Berndt et al. | 474/135 |
| 5,795,257 A * | 8/1998 | Giese et al. | 474/109 |
| 5,803,850 A * | 9/1998 | Hong et al. | 474/135 |
| 5,919,107 A * | 7/1999 | Stepniak | 474/112 |
| 5,964,674 A * | 10/1999 | Serkh et al. | 474/109 |
| 5,967,919 A | 10/1999 | Bakker | |
| 6,004,235 A * | 12/1999 | Ohta et al. | 474/109 |
| 6,196,941 B1 | 3/2001 | Ohta et al. | |
| 6,231,465 B1 * | 5/2001 | Quintus | 474/133 |
| 6,575,860 B2 * | 6/2003 | Dutil | 474/135 |
| 6,666,784 B1 * | 12/2003 | Iwamoto et al. | 474/109 |
| 6,682,452 B2 * | 1/2004 | Quintus | 474/135 |
| 6,689,002 B1 * | 2/2004 | Hascoat | 474/135 |
| 6,855,079 B2 * | 2/2005 | Cura et al. | 474/135 |
| 6,863,631 B2 * | 3/2005 | Meckstroth et al. | 474/135 |
| 7,004,865 B2 * | 2/2006 | Berndt et al. | 474/135 |
| 7,144,344 B2 * | 12/2006 | Konanz | 474/117 |
| 7,186,196 B2 * | 3/2007 | Quintus | 474/135 |
| 7,267,626 B2 * | 9/2007 | Kawasaki et al. | 474/135 |
| 7,273,432 B2 * | 9/2007 | Schonmeier et al. | 474/135 |
| 7,448,974 B2 * | 11/2008 | Crist et al. | 474/133 |
| 7,497,794 B2 * | 3/2009 | Lannutti et al. | 474/135 |
| 2003/0171179 A1 * | 9/2003 | Okuda et al. | 474/110 |
| 2004/0014542 A1 * | 1/2004 | Quintus | 474/135 |
| 2005/0043130 A1 | 2/2005 | Hao et al. | |
| 2007/0142148 A1 * | 6/2007 | Joslyn et al. | 474/135 |

FOREIGN PATENT DOCUMENTS

| | | |
|---|---|---|
| DE | 4125494 C1 | 11/1992 |
| DE | 4300178 C1 | 4/1994 |
| EP | 00361899 A1 | 4/1990 |
| EP | 00364277 A1 | 4/1990 |
| EP | 00425246 A1 | 5/1991 |
| EP | 00536809 A1 | 4/1993 |
| EP | 0709595 A | 5/1996 |
| EP | 0857890 A | 8/1998 |
| JP | 05-083516 | 11/1993 |
| WO | 03/069186 | 8/2003 |

* cited by examiner

BELT TENSIONER WITH WEAR COMPENSATION

CROSS-REFERENCE TO RELATED APPLICATIONS

This application is a 371 of PCT/CA2006/000422 filed Mar. 20, 2006, which claims the benefit of U.S. Provisional No. 60/663,853 filed Mar. 21, 2005.

FIELD OF THE INVENTION

The present invention relates to a tensioner which operates to maintain a substantially constant tension in a flexible drive, such as a belt or chain. More specifically, the present invention relates to a tensioner which includes means to compensate for the wear of components of the tensioner which occurs during use.

BACKGROUND OF THE INVENTION

Tensioners for flexible drives, such as accessory serpentine belts on automotive engines are well known. Such tensioners typically include a pulley, roller or other member, which is biased against the flexible drive by a spring or other biasing means. The pulley is mounted, via a bearing, to an arm which pivots with respect to the tensioner housing. The housing contains the spring or other biasing means which biases the arm towards the flexible drive to maintain a substantially constant tension in the flexible drive. Conventional tensioners can also include frictional members which ride on one another as the tensioner arm moves to provide a dampening force to the tensioner.

While such prior art tensioners are widely employed, they do suffer from some disadvantages. In particular, due to the relatively large forces which must be carried by the tensioner arm, wear at the pivot attaching the arm to the tensioner housing is common and such wear can result in the pulley moving to an off-axis position wherein the surface of the pulley is not substantially perpendicular to the engagement surface of the flexible drive. Such off-axis positioning of the pulley results in increased amounts of wear at the pivot and eventually will result in the flexible drive being damaged and/or slipping off the tensioner pulley altogether.

It is desired to have a tensioner which provides a suitable dampening force, can provide compensation for normal wear of its components and which resists off-perpendicular movement of its components.

SUMMARY OF THE INVENTION

It is an object of the present invention to provide a novel tensioner which obviates or mitigates at least one disadvantage of the prior art.

According to a first aspect of the present invention, there is provided a tensioner to tension a flexible drive, comprising: a spindle having a base and a shaft extending perpendicular thereto; a bushing having an outer frustoconical surface and an inner surface complementary to the shape of the spindle shaft, the bushing receiving the shaft in its inner surface; a tensioner arm having a pivot surface complementary to and engaging the outer frustoconical surface of the bushing to allowing the tensioner arm to pivot about a central axis of the spindle shaft, the tensioner arm further having an attachment point for a rotatable member to engage a flexible drive, the attachment point being spaced from the pivot surface; a spring acting between the spindle and the tensioner arm to bias the tensioner arm to a first pivotal position about the spindle; and a wear take up mechanism to bias the bushing towards the pivot surface to compensate for wear of the bushing and/or pivot surface.

The present invention provides a novel tensioner for use with flexible drives, such as serpentine accessory belts on automobiles or the like. The tensioner includes a tensioner arm to spindle pivot design which employs a frustoconical bushing between an inner pivot surface of the tensioner arm and a spindle shaft. The frustoconical design of the bushing resists off axis movement of the tensioner arm and a wear take up mechanism biases the bushing into contact with the inner pivot surface to compensate for normal wear of the bushing and/or pivot surface. A thrust plate is mounted to the end of the spindle shaft and rides in a thrust washer, the thrust plate and thrust washer being held captive in the tensioner arm such that the tensioner arm can pivot about the bushing and the spindle and the thrust plate and thrust washer assist in inhibiting off-axis movement of the tensioner arm.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
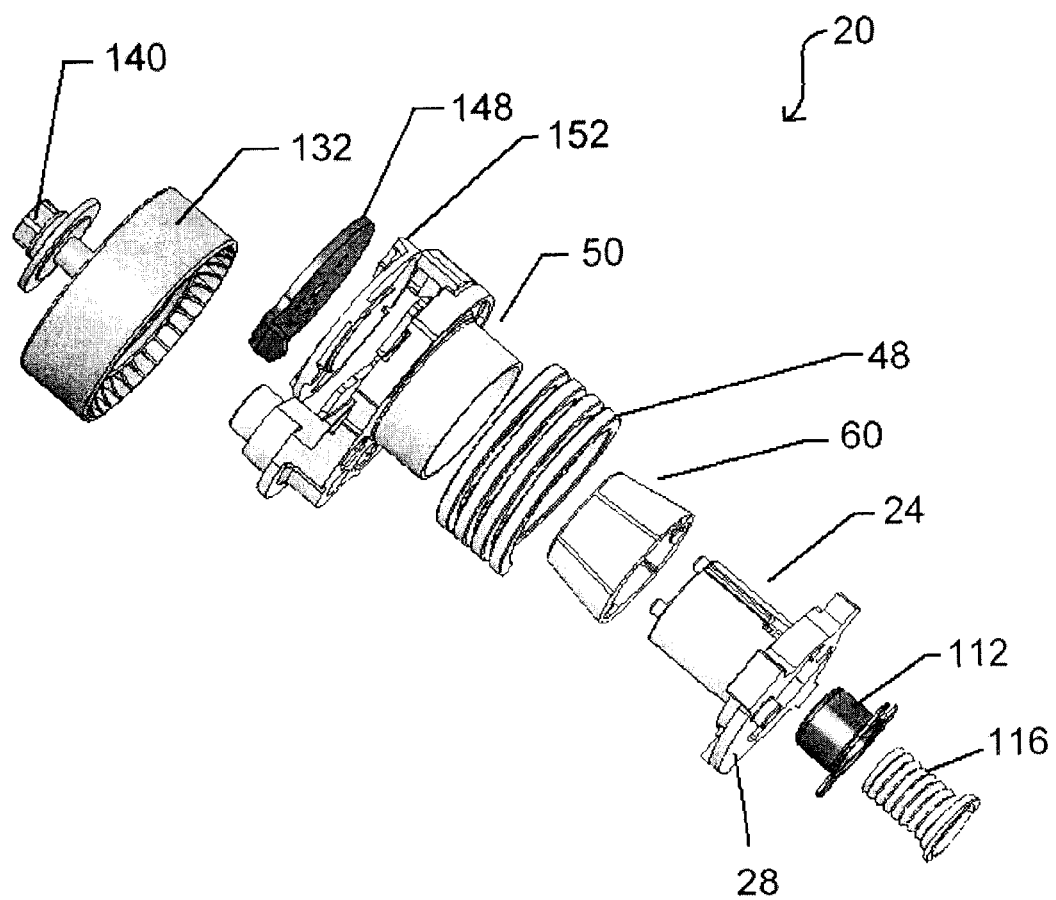
FIG. 1 shows a perspective exploded view of a tensioner in accordance with the present invention.

A tensioner in accordance with the present invention is indicated generally at 20 in FIG. 1. Tensioner 20 comprises a spindle 24, best seen in FIG. 2, which includes a base 28 to abut an engine (not shown) when tensioner 20 is installed. Base 28 can include one or more index features, such as tab 32, which can engage complementary features on an engine to ensure that tensioner 20 is installed in, and remains in, a desired rotational orientation on the engine. Spindle 20 further includes a cylindrical shaft 36, which extends from base 28, and a spring raceway 40 with an endstop 44.

Figure 3A:
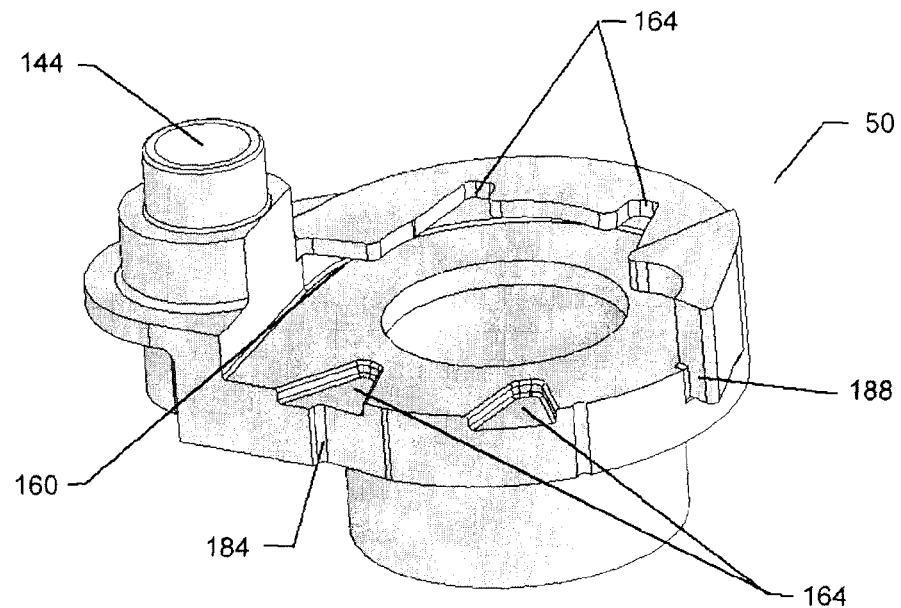
FIGS. 3a and 3b show a perspective top and bottom view, respectively, of a tensioner arm for the tensioner of FIG. 1.
Figure 3B:
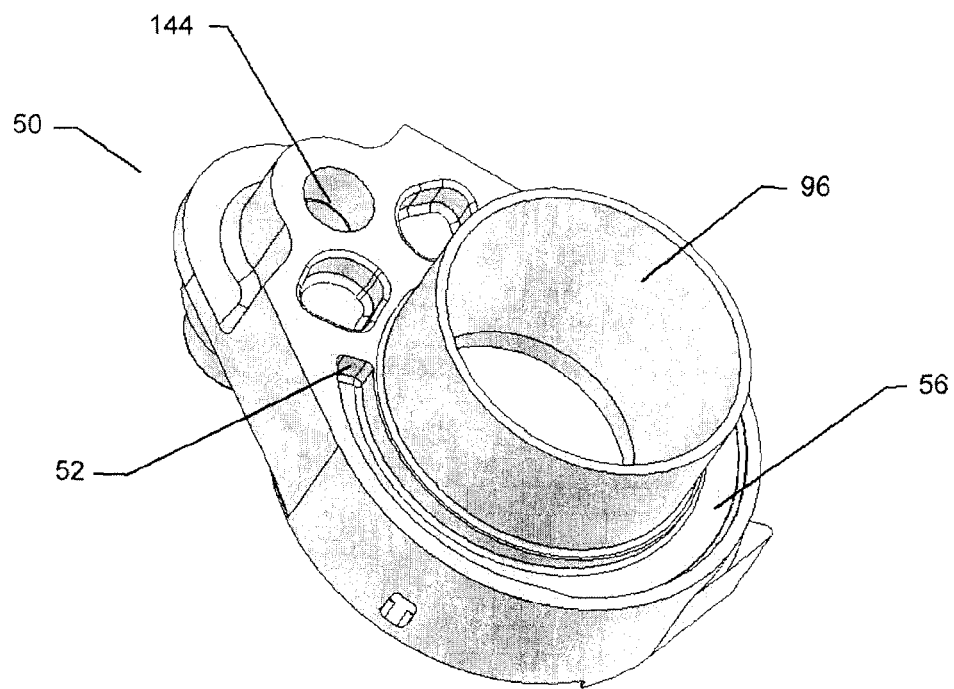

A helical spring 48 acts between spindle 24 and a tensioner arm 50, best seen in FIGS. 3a and 3b. In the illustrated embodiment, spring 48 is expanded as tensioner arm 50 is moved from its at rest position. In this configuration, spring 48 includes a first end which abuts endstop 44 when helical spring 48 is received in raceway 40 in spindle 24 and the opposite end of helical spring 48 abuts an endstop 52 on tensioner arm 50 when spring 48 is received in a raceway 56 in tensioner arm 50.

While it is presently preferred that spring 48 expand as tensioner arm 50 is moved from its at rest position as this avoids the expense for forming tangs at the ends of spring 48, it is also contemplated that spring 48 can be arranged to be contracted as tensioner arm 50 is moved from its at rest position. In this configuration spring 48 will typically be provided with a bent tang at each end and tensioner arm 50 and spindle 24 will be provided with grooves or apertures to capture and retain the respective spring tangs.

Tensioner arm 50 is pivotally mounted to shaft 36 of spindle 24 and is biased towards the flexible drive (not shown) to be tensioned by helical spring 48. Specifically, a bearing 60, best seen in FIG. 4, includes a cylindrical inner aperture 64 into which shaft 36 of spindle 24 is inserted. Inner cylindrical aperture 64 further includes at least one feature to index bearing 60 on shaft 36 to prevent rotation of bearing 60 on shaft 36. In the illustrated embodiment, bearing 60 includes three ribs 72, 76 and 80 which engage complementary slots 84, 88 and 92 respectively to prevent bearing 60 from rotating on shaft 36 while allowing bearing 60 to be moved along shaft 36. The outer surface 68 of bearing 60 is frustoconical in shape, with bearing 60 receiving shaft 36 such that the large radius end of surface 68 is adjacent base 28.

Figure 5:
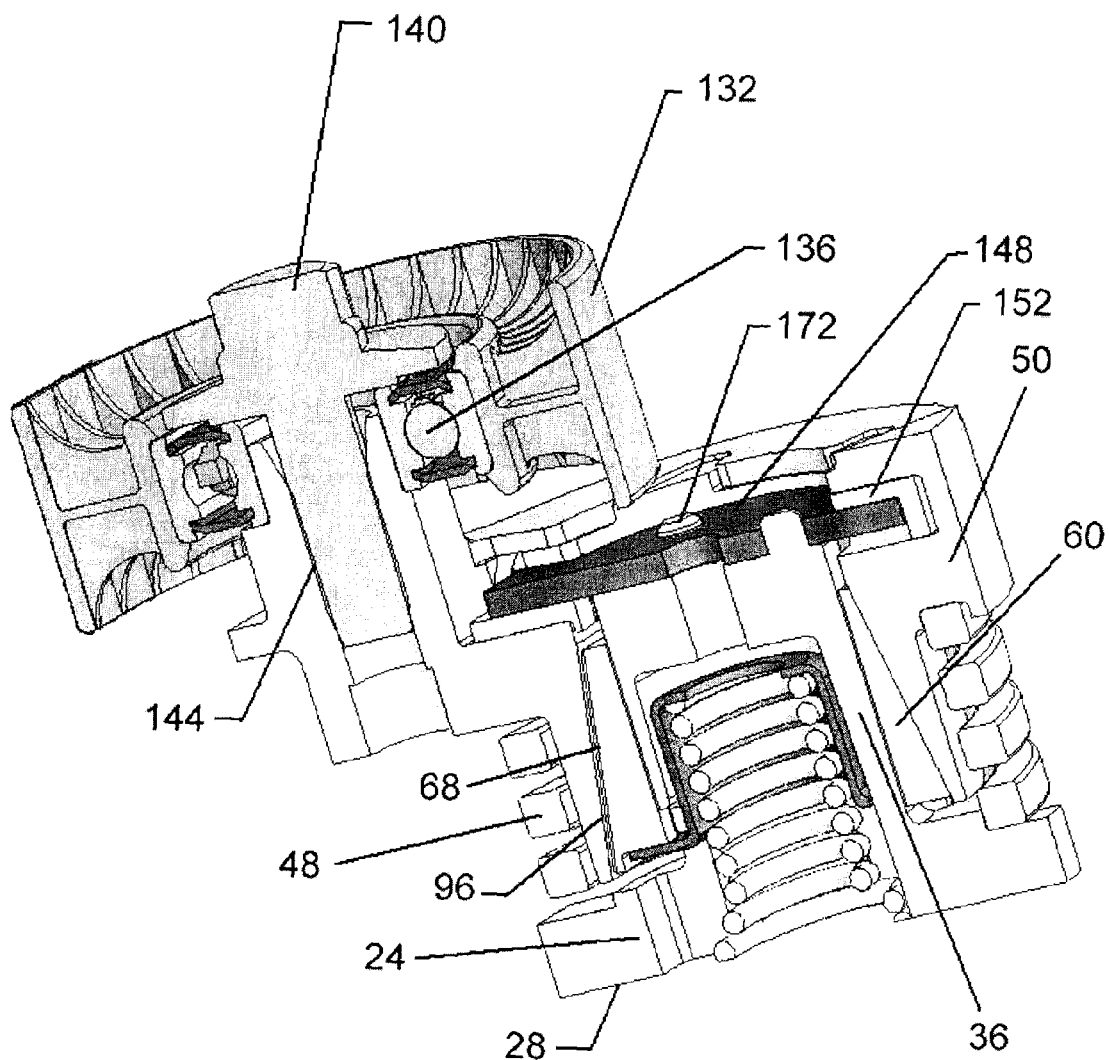
FIG. 5 shows a side cross section view of the assembled tensioner of FIG. 1.

Tensioner arm 50 includes an inner pivot surface 96 which is complementary in shape to outer surface 68 of bearing 60. When assembled, as shown in FIG. 5, pivot surface 96 rides on outer surface 68 to allow tensioner arm 50 to pivot about the centerline of shaft 36.

Figure 4:
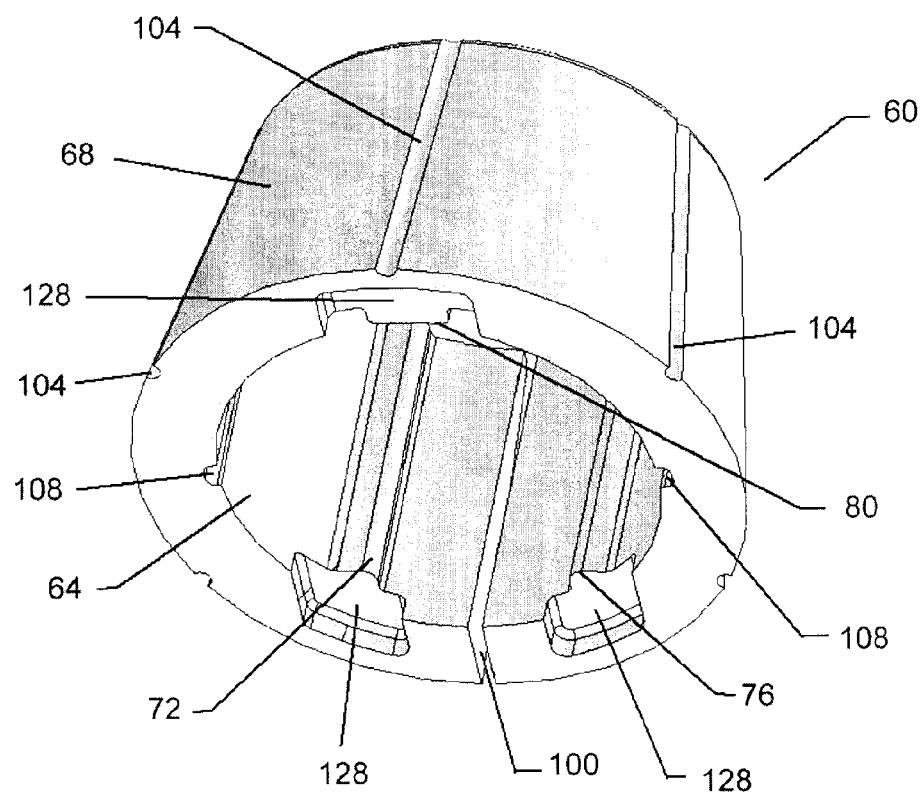
FIG. 4 shows a perspective view of a bushing for the tensioner of FIG. 1.

Returning to FIG. 4, bearing 60 is preferably made from a material such as Delrin™, or other reasonably hard nylon, which allows inner surface 96 of tensioner arm 50 to pivot on outer surface 68 as tensioner 20 operates, without undue wear of either inner surface 96 or outer surface 68 occurring. As is also shown in FIG. 4, bearing 60 is preferably fabricated with a break 100, which provides some accommodation for manufacturing tolerances of shaft 36 and/or bearing 68, and at least one debris groove 104 on outer surface 68 and at least one debris groove 108 on inner surface 64. Debris grooves 104 capture water and/or foreign materials entrapped between outer surface 68 and inner surface 96 and allow the debris to travel along grooves 104 and exit tensioner 20 to reduce wear of the respective surfaces from entrapped debris. Similarly, debris grooves 108 capture water and/or foreign materials entrapped between inner surface 64 and the outer surface of shaft 36 and allow the debris to travel along grooves 108 and exit tensioner 20 to reduce wear of the respective surfaces from entrapped debris.

As will be apparent to those of skill in the art, despite the appropriate selection of a material to fabricate bushing 60 and the provision of debris grooves 104 and 108, outer surface 68 of bushing 60 will eventually wear under normal use. Accordingly, in the present invention, as wear of outer surface 68 occurs, bushing 60 is urged away from base 28 along shaft 36 by a wear take up mechanism and this results in outer surface 68 being maintained in full contact with inner pivot surface 96 despite wear of outer surface 68.

Figure 6:
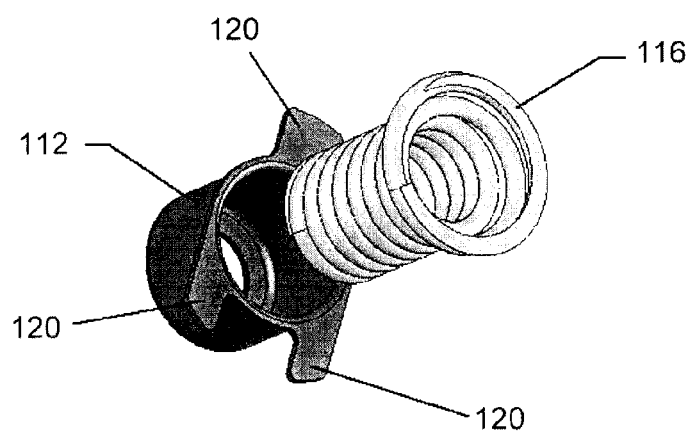
FIG. 6 shows a wear take up mechanism for the tensioner of FIG. 1.

In the embodiment of the present invention illustrated in FIGS. 1 through 7, the wear take up mechanism comprises a bushing guide 112 and a compression spring 116, best seen in FIG. 6. Bushing guide 112 includes tabs 120 which extend through slots 124 in shaft 36 to engage tab receiving grooves 128 in the base of bushing 60. Compression spring 116 is pressed into spindle 24 with bushing guide 112 and compression spring 116 acts between the inner surface of base 28 and bushing guide 112 to bias bushing guide 112 away from base 28. As tabs 120 engage bushing 60, the biasing force of spring 116 is applied to bushing 60 and outer surface 68 is biased into contact with inner pivot surface 96.

Figure 9:
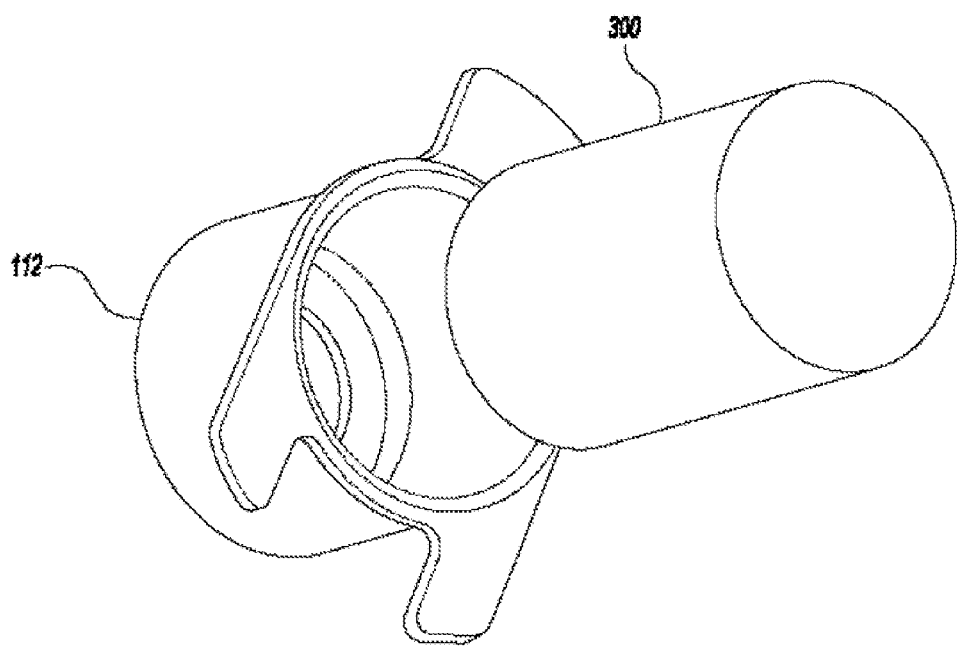
FIG. 9 shows another wear take up mechanism for the tensioner of FIG. 1 including an elastomeric spring.

Spring 116 can be of a wide variety of types and/or designs, as will occur to those of skill in the art, to achieve a desired dampening function for tensioner 20. For example, spring 116 can be a straight coil (i.e.—linear) spring, a tapered coil spring, an elastomeric spring 300 as shown in FIG. 9, such as a synthetic rubber member, a closed cell foam spring, etc. Selection of an appropriate spring design is within the normal skills of those of skill in the art and will not be further discussed herein.

It is also contemplated that, in some embodiments, bushing guide 112 can be omitted and spring 116 can act directly against bushing 60 via a tang or other feature that extends through slots 124 to engage the end of bushing 60.

As will now be apparent to those of skill in the art, by biasing bushing 60 toward tensioner arm 50, outer surface 68 of bushing 60 is maintained in contact with inner pivot surface 96, despite wear of bushing 60 which may occur in normal use of tensioner 50. By maintaining outer surface 68 in contact with inner pivot surface 96, off-axis movement (i.e.—tilt) of tensioner arm 50 is prevented. Further, as is understood by those of skill in the art, the friction between outer surface 68 of bushing 60 and inner pivot surface 96 acts as a dampening force to reduce oscillations of tensioner arm 50 during operation. By biasing bushing 60 toward tensioner arm 50 to maintain contact of outer surface 68 with inner pivot surface 96, the dampening force created therebetween is substantially constant, despite normal wear of bushing 60. Further, changes in the dampening force between tensioner arm 50 and spindle 24 and/or changes to the alignment of tensioner arm 50 and spindle 24 which may otherwise occur due to thermal expansion of components of tensioner 20 are mitigated by the above described movement of bushing 60 along shaft 36, towards and/or away from inner pivot surface 96.

As shown in FIGS. 1 and 5, a rotatable member is connected to tensioner arm 50 to engage the flexible drive and apply the tensioning force created by tensioner 20 to the flexible drive. In the illustrated embodiment, the rotatable member comprises a pulley 132 with a roller bearing 136 which allows it to rotate freely with a flexible drive about a bolt 140 by which it is mounted to tensioner arm 50. While in the illustrated embodiment, bearing 136 is a separate component, it is also contemplated that in other embodiments bearing 136 can be integrally formed with pulley 132 if desired. Bolt 140 engages an internally threaded bore 144 in tensioner arm 50.

Figure 7:
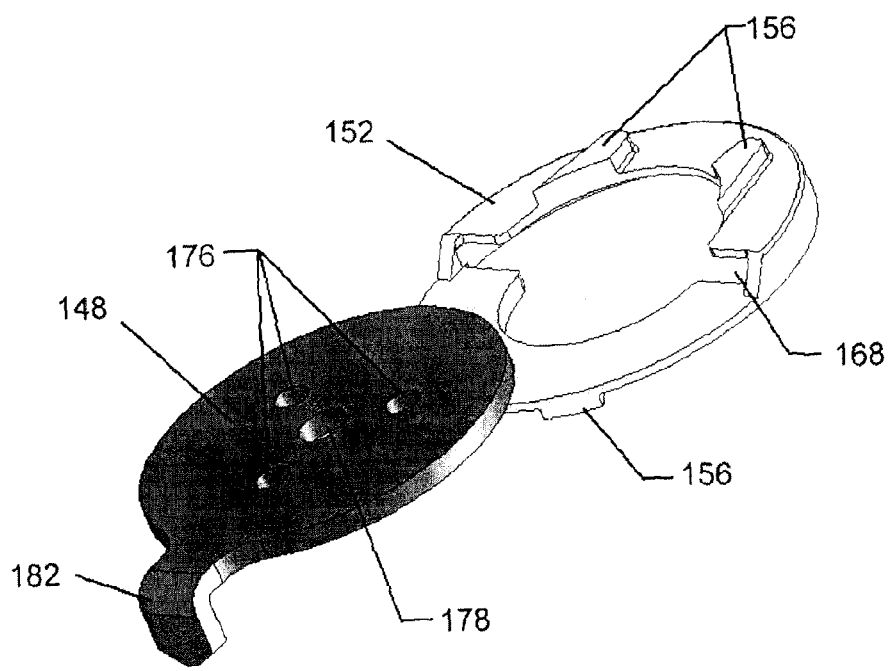
FIG. 7 shows a thrust plate and thrust washer for the tensioner of FIG. 1.

Tensioner arm 50 is mounted to spindle 24 by a thrust plate 148 and thrust washer 152, best seen in FIG. 7. Thrust washer 152 includes indexing tabs 156 to prevent rotation of thrust washer 152, with respect to tensioner arm 50, when tensioner 20 is assembled. To assemble tensioner 20, thrust washer 152 is inserted into a slot 160 (best seen in FIG. 3a) in tensioner arm 50. Slot 160 includes index grooves 164 which are complementary to index tabs 156 on thrust washer 152 and which engage index tabs 156 when thrust washer 152 is inserted into slot 160.

Figure 2:
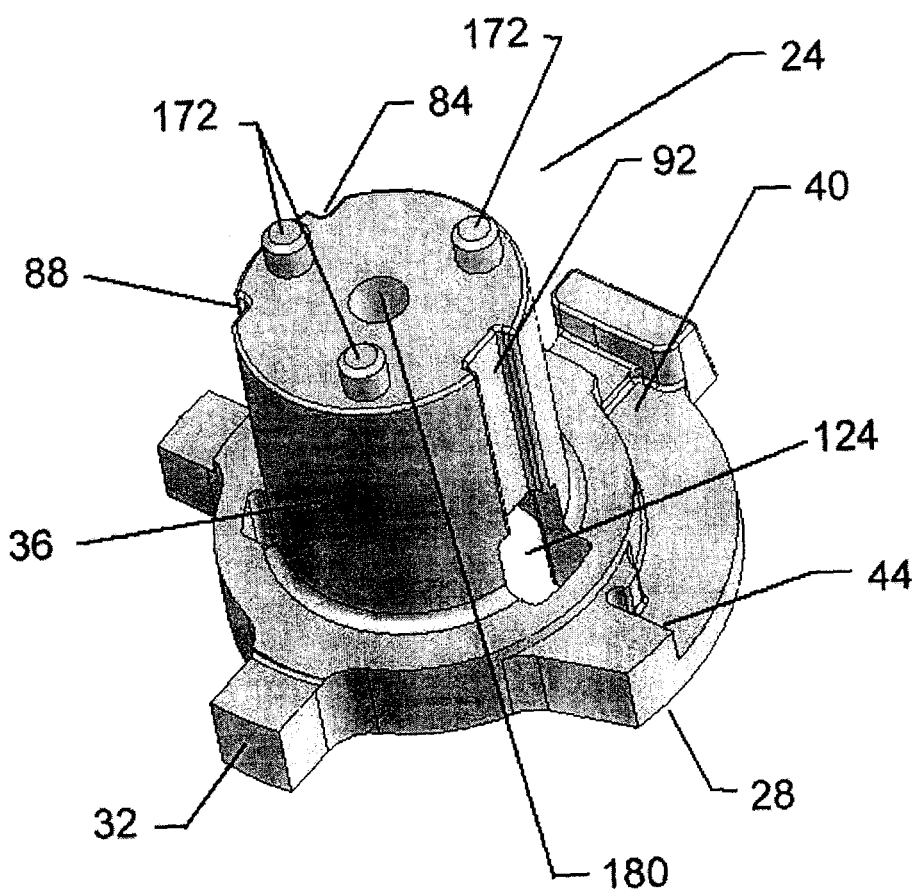
FIG. 2 shows a spindle for the tensioner of FIG. 1.

Once thrust washer 152 is in place in slot 160, thrust plate 148 is inserted into a slot 168 in thrust washer 152. As shown in FIG. 2, spindle 24 includes a set of staking posts 172 and thrust plate 148 includes a complementary set of staking bores 176. When thrust washer 152 and thrust plate 148 are assembled in tensioner arm 50, the resulting assembly can be joined to spindle 24 and helical spring 48 with staking posts 172 being received in staking bores 176 and tensioner 20 permanently joined, as shown in FIG. 5, by compressing and flaring staking posts 172 in bores 176. A center bore 178 in thrust plate 148 aligns with a similar center bore 180 in spindle 24 and these bores allow tensioner 20 to be installed on an engine or other device by a bolt or other fastener passing therethrough.

In the illustrated embodiment, thrust plate 148 includes a limit tang 182 which extends radially outwardly and then downwardly from thrust plate 148 and tensioner arm 50 includes a pair of end stops 184 and 188 which limit tang 180 will abut at each end of the intended operating range of tensioner 20 to limit further rotation of tensioner arm 50. As will be apparent to those of skill in the art, a wide variety of other geometries can be employed for limit tang 180 and/or end stops 184 and 188 to provide a desired operating range for tensioner 20. Thrust washer 162 is preferably fabricated from a material similar to that from which bushing 60 is fabricated to allow rotation of tensioner arm 50 with respect to spindle 24 and thrust plate 148.

It is believed that the design and arrangement of thrust washer 152, thrust plate 148 and tensioner arm 50 provide advantages to tensioner 20. In particular, the large radial diameter of thrust plate 148 against which tensioner arm 50 rides, via thrust washer 152, provides a large surface and moment arm to prevent off-axis movement of tensioner arm 50 and pulley 132. Further, the frictional force developed between thrust plate 148 and thrust washer 152 provide further dampening for tensioner 20.

As mentioned above, off-axis movement of tensioner arm 50 and/or pulley 132 can result in increased wear of tensioner 20 and/or the flexible drive means being tensioned and, if the off-axis movement is sufficient to allow the flexible drive means to move off of pulley 132, failure of the flexible drive means. Accordingly, the novel wear compensation mechanism of the present invention is believed to afford significant advantages in reducing off-axis movement of tensioner arm 50. Further, the novel arrangement of thrust plate 148 and thrust washer 152 with tensioner arm 50 advantageously further reduces off-axis movement of tensioner arm 50 and pulley 132.

Figure 10:
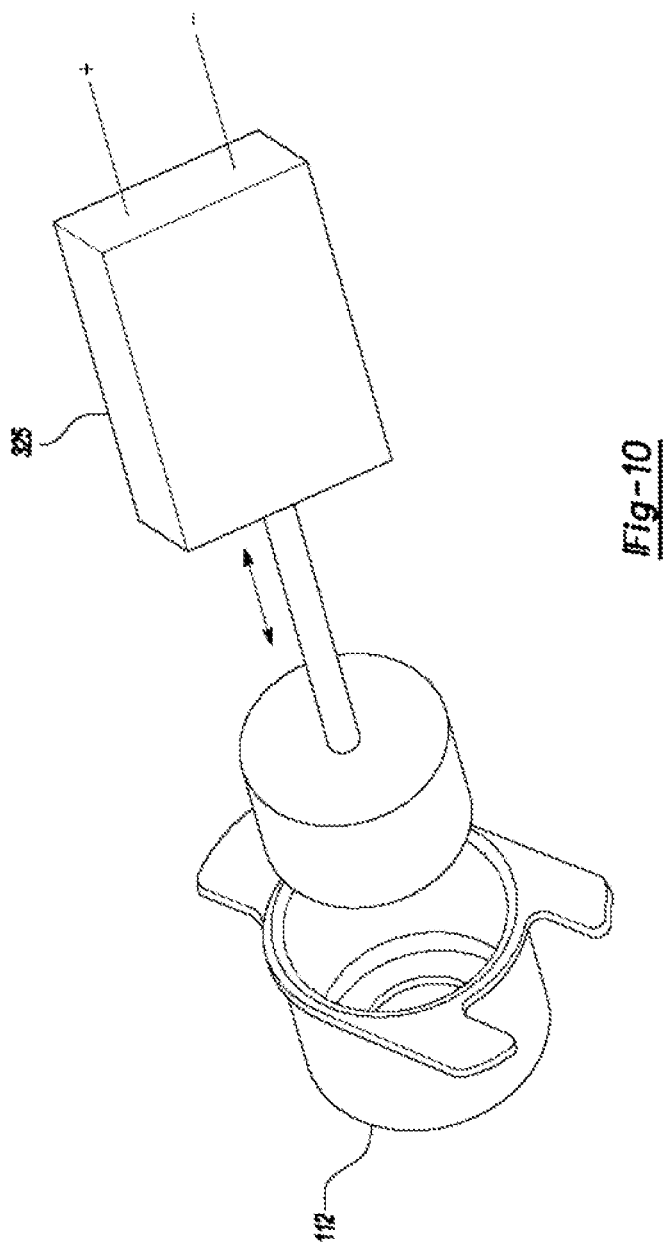
FIG. 10 shows another wear take up mechanism for the tensioner of FIG. 1 including an electronic solenoid.
Figure 11:
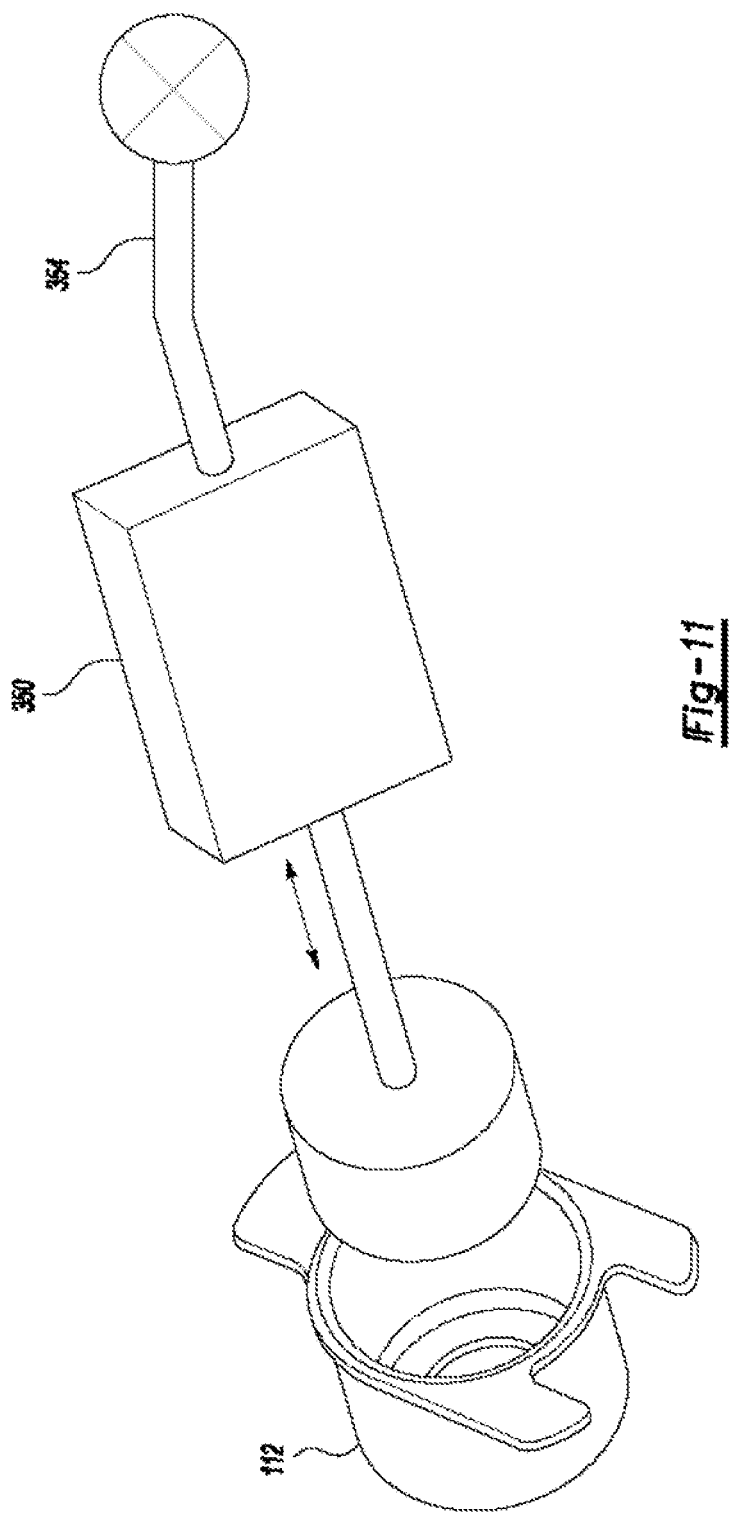
FIG. 11 shows another wear take up mechanism for the tensioner of FIG. 1 including a pneumatic actuator.

While it is important for proper operation of flexible drive means, such as accessory serpentine belt drive on automobiles, that their tensioners provide adequate dampening to the flexible drive, it is contemplated by the present inventors that it can be advantageous to have the ability to vary the amount of dampening for different operating conditions. Accordingly, it is contemplated that compression spring 116 of the wear take up mechanism of the present invention can be replaced by, or used in conjunction with, a controllable actuator, such as an electric solenoid 325 as shown in FIG. 10, or a pressure actuator 350 as shown in FIG. 11, such as a pneumatic actuator supplied with pressurized engine lubricating oil 354. In such a case, the amount of dampening produced by the frictional force between bushing 60 and tensioner arm 50 can be varied by altering the biasing force applied to bushing 60 by the wear take up mechanism. When high mounts of dampening are required, increased biasing force can be applied to bushing 60 to increase the frictional force developed between outer surface 68 and inner pivot surface 96. When lower amounts of dampening are required, a reduced biasing force can be applied to bushing 60 to decease the frictional force developed between outer surface 68 and inner pivot surface 96. However, in either circumstance, it is contemplated that sufficient biasing force will always be applied to bushing 60 to compensate for wear.

Figure 8:
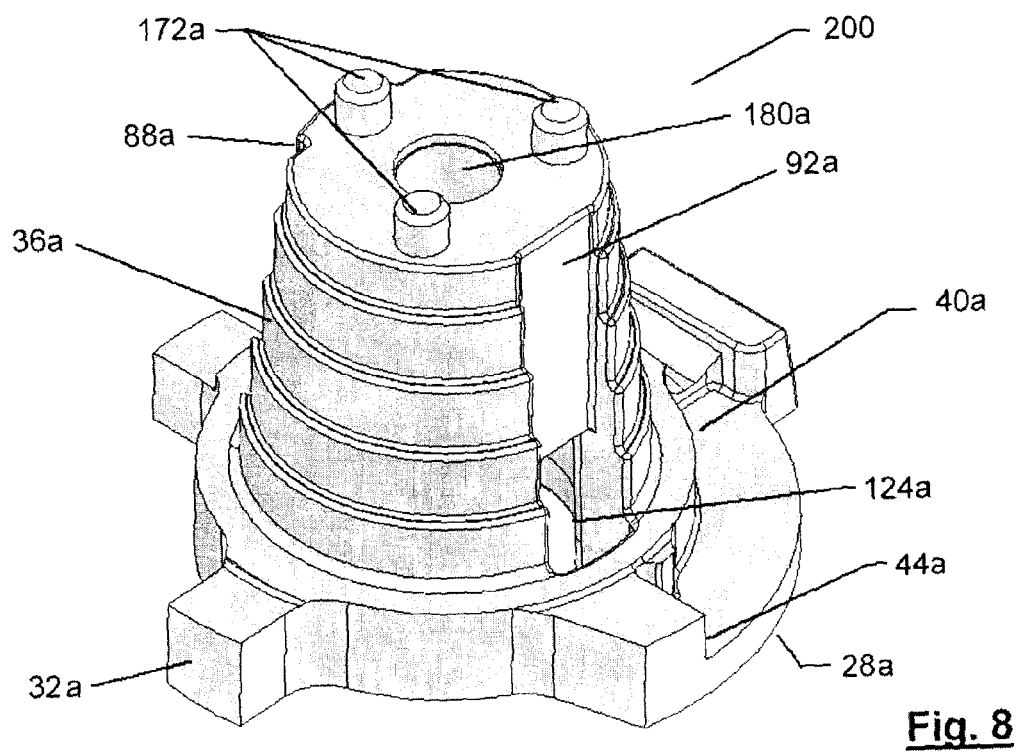
FIG. 8 shows another embodiment of a spindle for the tensioner of FIG. 1.
Figure 12:
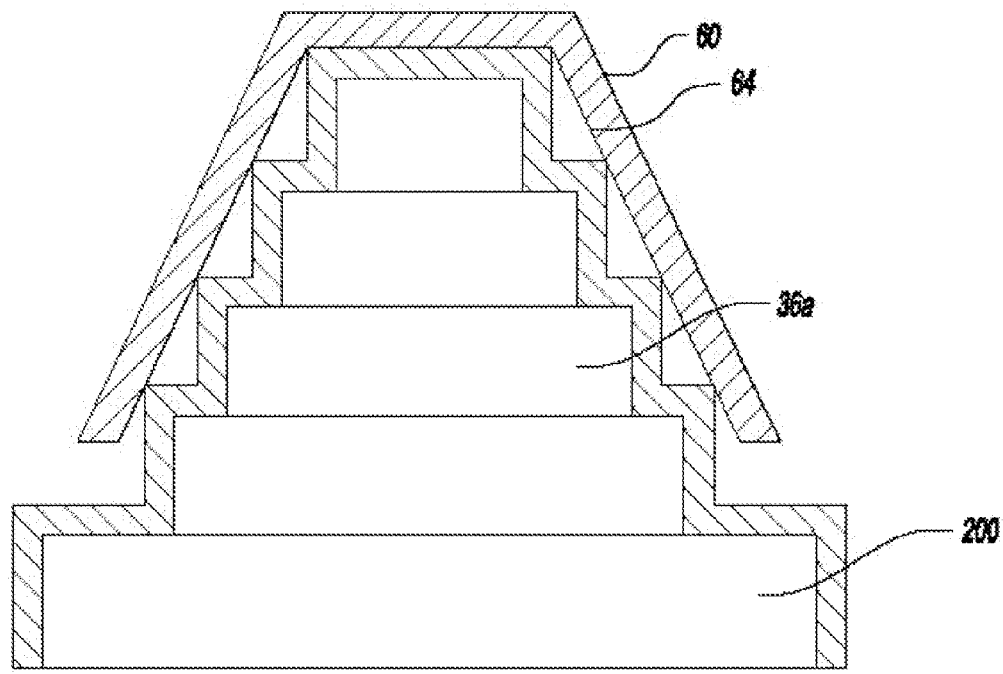
FIG. 12 shows a side cross section of a bushing in place on the spindle of FIG. 8.

A second embodiment of a spindle 200 for tensioner 20 is illustrated in FIG. 8 wherein like features to those of spindle 24 are indicated with like reference numbers with an "a" appended thereto. In this embodiment, shaft 36a of spindle 200 is formed with a series of small step-like decreases in the radius of shaft 36a. As will be apparent to those of skill in the art, by forming spindle 200 with shaft 36a having such small decreases in its radius, the expense of manufacturing and operating molds for spindle 200 is reduced from that of spindle 24. If spindle 200 is to be used in tensioner 20, the inner surface 64 of bushing 60 will be formed in a slightly frustoconical shape complementary to the shape of shaft 36a and, in conjunction with break 100 in bushing 60, bushing 60 will still ride on shaft 36a with sufficient alignment to provide the desired resistance to off-axis movement of tensioner arm 50, as illustrated in FIG. 12.

The present invention provides a novel tensioner for use with flexible drives, such as serpentine accessory belts on automobiles. The tensioner includes a tensioner arm to spindle pivot design which employs a frustoconical bushing between an inner pivot surface of the tensioner arm and a spindle shaft. The frustoconical design of the bushing resists off axis movement of the tensioner arm and a wear take up mechanism biases the bushing into contact with the inner pivot surface to compensate for normal wear of the bushing and/or pivot surface. A thrust plate is mounted to the end of the spindle shaft and rides in a thrust washer, the thrust plate and thrust washer being held captive in the tensioner arm such that the tensioner arm can pivot about the bushing and the spindle and the thrust plate and thrust washer assist in inhibiting off-axis movement of the tensioner arm.

In one embodiment, the biasing force which biases the bushing against the inner pivot surface of the tensioner arm can be varied to change the amount of dampening of the tensioner.

The above-described embodiments of the invention are intended to be examples of the present invention and alterations and modifications may be effected thereto, by those of skill in the art, without departing from the scope of the invention which is defined solely by the claims appended hereto.

We claim:

1. A tensioner to tension a flexible drive, comprising:
a spindle having a base and a shaft extending perpendicular thereto;
a bushing having an outer frustoconical surface and an inner surface complementary to the shape of the spindle shaft, the bushing receiving the shaft in the inner surface;
a tensioner arm having an inner pivot surface complementary to and engaging the outer frustoconical surface of the bushing to allow the tensioner arm to pivot about a central axis of the spindle shaft, the tensioner arm further having an attachment point for a rotatable member to engage a flexible drive, the attachment point being spaced from the pivot surface;
a first spring acting between the spindle and the tensioner arm to bias the tensioner arm to a first pivotal position about the spindle;
a wear take up mechanism to bias the bushing along the spindle shaft towards the inner pivot surface to compensate for wear of the bushing and/or pivot surface and to create a frictional dampening force between the bushing and the tensioner arm, wherein the wear take up mechanism comprises a second spring acting between the spindle and the bushing; and
a bushing guide moveable within the spindle and including at least one tab extending through a slot from within the spindle to the bushing wherein the second spring acts between the spindle and the bushing guide and the bushing guide biases the bushing towards the inner pivot surface.

2. The tensioner of claim 1 further comprising a rotatable member to engage a flexible drive, the rotatable member being mounted to the attachment point of the tensioner arm via a bearing.

3. The tensioner of claim 2 wherein the rotatable member is a pulley and the bearing is a roller bearing.

4. The tensioner of claim 1 wherein the second spring is a coil spring.

5. The tensioner of claim 1 wherein the second spring is an elastomeric element.

6. The tensioner of claim 1 wherein the tensioner arm includes a slot to receive a thrust plate and a thrust washer and wherein the thrust plate is affixed to the end of the spindle about the central axis of the shaft to keep the thrust plate and thrust washer captive in the tensioner arm, the thrust plate being operable to inhibit the tensioner arm from movement off-axis with respect to the central axis of the shaft.

7. The tensioner of claim 1 wherein the wear take up mechanism comprises a solenoid which is electrically operable to vary the force with which the bushing is biased towards the inner pivot surface.

8. The tensioner of claim 1 wherein the wear take up mechanism comprises a hydraulic actuator which is operable to vary the force with which the bushing is biased towards the inner pivot surface.

9. The tensioner of claim 1 wherein the radial diameter of the shaft decreases in a series steps from the base of the spindle and the inner surface of the bushing has a shape which is complementary to the shape of the shaft.

10. The tensioner of claim 1 wherein the wear take up mechanism mitigates changes in operation of the tensioner due to thermal expansion.

11. The tensioner of claim 1 wherein the spring force of the second spring is selected to achieve a pre-selected frictional dampening force between the bushing and the tensioner arm.

* * * * *